US012785559B2

(12) United States Patent
Mo et al.

(10) Patent No.: US 12,785,559 B2
(45) Date of Patent: Nov. 3, 2026

(54) APPARATUS COMPRISING A CONTROLLER FOR A SWITCHING CONVERTER

(71) Applicant: RENESAS ELECTRONICS AMERICA INC., Milpitas, CA (US)

(72) Inventors: Chi Mo, Irvine, CA (US); Shubing Zhai, San Jose, CA (US); Xueqiang Ding, San Jose, CA (US); Xin Xue, San Diego, CA (US)

(73) Assignee: Renesas Electronics America Inc., San Jose, CA (US)

( * ) Notice: Subject to any disclaimer, the term of this patent is extended or adjusted under 35 U.S.C. 154(b) by 586 days.

(21) Appl. No.: 18/447,760

(22) Filed: Aug. 10, 2023

(65) Prior Publication Data

US 2025/0062690 A1 Feb. 20, 2025

(51) Int. Cl.
*H02M 3/158* (2006.01)
*H02M 1/00* (2006.01)
*H02M 1/14* (2006.01)

(52) U.S. Cl.
CPC ......... *H02M 3/158* (2013.01); *H02M 1/0009* (2021.05); *H02M 1/14* (2013.01)

(58) Field of Classification Search
CPC ....... H02M 3/158; H02M 1/0009; H02M 1/14
See application file for complete search history.

(56) References Cited

U.S. PATENT DOCUMENTS 8,519,687 B2 8/2013 Kudo
10,727,744 B2 7/2020 Houston et al.
2012/0019225 A1* 1/2012 Tsai ...................... H02M 3/156 323/284
2012/0081094 A1* 4/2012 Luo ...................... H02M 3/156 323/284
2012/0153906 A1* 6/2012 Harriman .............. H02M 3/158 323/234
2012/0182003 A1* 7/2012 Flaibani ................ H02M 3/156 323/284
2012/0194162 A1* 8/2012 Lin ......................... H02M 1/14 323/304
2012/0212204 A1* 8/2012 Philbrick .............. H02M 3/156 323/284
2013/0033248 A1* 2/2013 Granger .............. H02M 3/1588 323/288

(Continued)

OTHER PUBLICATIONS

"AN-2171 Designing Constant-On-Time Buck Regulators for Low Drop-Out Voltage", SNVA496A, Jul. 2011, Revised Apr. 2013, 4 pages.

*Primary Examiner* — Rafael O De Leon Domenech
(74) *Attorney, Agent, or Firm* — SCULLY, SCOTT, MURPHY & PRESSER, P.C.

(57) ABSTRACT

An apparatus comprising a controller for a switching converter for receiving an input voltage and for providing an output voltage, the switching converter comprising a first switch and an energy storage element, the controller being configured to provide a first control signal to the first switch, the first control signal having a switching frequency, and control the switching frequency such that the switching frequency is substantially unaffected by variations in one or more of a load current, an equivalent series resistance of the energy storage element, and a turn on resistance of the first switch.

20 Claims, 15 Drawing Sheets

(56) References Cited

U.S. PATENT DOCUMENTS

| | | | | |
|---|---|---|---|---|
| 2014/0292288 | A1* | 10/2014 | Yan | H02M 3/156 323/234 |
| 2015/0263609 | A1* | 9/2015 | Weida | H02M 1/4208 323/234 |
| 2016/0301304 | A1* | 10/2016 | Zarkhin | H02M 3/156 |
| 2023/0402923 | A1* | 12/2023 | Zhang | H02M 1/0095 |

* cited by examiner

APPARATUS COMPRISING A CONTROLLER FOR A SWITCHING CONVERTER

The present disclosure relates to an apparatus comprising a controller for a switching converter.

BACKGROUND

A switching converter is an electronic device used to convert electrical power efficiently from one form to another.

Switching converters can step up (boost), step down (buck), or invert the input voltage, depending on the desired output voltage. They are capable of providing regulated output voltages with variations in the input voltage.

A controller for a switching converter is a crucial component that governs the operation and regulation of the converter. It is responsible for controlling the switching signals to maintain a desired output voltage.

SUMMARY

It is desirable to optimize the operation of the controller for a switching converter.

According to a first aspect of the disclosure there is provided an apparatus comprising a controller for a switching converter for receiving an input voltage and for providing an output voltage, the switching converter comprising a first switch and an energy storage element, the controller being configured to provide a first control signal to the first switch, the first control signal having a switching frequency, and control the switching frequency such that the switching frequency is substantially unaffected by variations in one or more of i) a load current, ii) an equivalent series resistance of the energy storage element, and iii) a turn on resistance of the first switch.

Optionally, the controller is configured to control the switching frequency to maintain a substantially constant switching frequency irrespective of variations in the one or more of i) the load current, ii) the equivalent series resistance of the energy storage element, and iii) the turn on resistance of the first switch.

Optionally, the first control signal is configured to set the first switch to an on state for an on time and an off state for an off time, and the controller is configured to set the on time and/or the off time based on one or more of the i) the load current, ii) the equivalent series resistance of the energy storage element, and iii) the turn on resistance of the first switch, thereby controlling the switching frequency such that the switching frequency is substantially unaffected by the variations.

Optionally, the controller is configured to control the switching frequency to maintain a substantially constant switching frequency irrespective of variations in the one or more of i) the load current, ii) the equivalent series resistance of the energy storage element, and iii) the turn on resistance of the first switch.

Optionally, the controller is configured to set the on time and/or off time using the input voltage, the output voltage, the load current, the equivalent series resistance of the energy storage element and the turn on resistance of the first switch.

Optionally, the controller is configured to receive information on one or more of the load current, the equivalent series resistance of the energy storage element and the turn on resistance of the first switch.

Optionally, the apparatus comprises a current sensor configured to measure the load current and provide information on the load current to the controller.

Optionally, the switching converter comprises a buck converter comprising the first switch and a second switch, wherein the energy storage element comprises an inductor, and the controller is configured to provide a second control signal to the second switch, the control signal having the switching frequency.

Optionally, the switching converter comprises a buck converter, a boost converter or a buck-boost converter comprising the first switch and a second switch, wherein the energy storage element comprises an inductor, and the controller is configured to provide a second control signal to the second switch, the control signal having the switching frequency.

Optionally, the controller is configured control the switching frequency such that the switching frequency is substantially unaffected by variations in a turn on resistance of the second switch.

Optionally, the first control signal is configured to set the first switch to an on state for an on time and an off state for an off time, and the controller is configured to set the on time and/or the off time based on the load current, the equivalent series resistance of the energy storage element, the turn on resistance of the first switch, and the turn on resistance of the second switch, thereby controlling the switching frequency such that the switching frequency is substantially unaffected by the variations.

Optionally, the controller is configured to control the switching frequency to maintain a substantially constant switching frequency irrespective of variations in the load current, the equivalent series resistance of the energy storage element, the turn on resistance of the first switch, and the turn on resistance of the second switch.

Optionally, the controller is configured to set the on time and/or off time using the input voltage, the output voltage, the load current, the equivalent series resistance of the energy storage element, the turn on resistance of the first switch and the turn on resistance of the second switch.

Optionally, the on time as set by the controller is proportional to $$\frac{Vout + IL \times (Rind + RL)}{Vin - IL \times (RH - RL)},$$

where Vin is the input voltage, IL is the load current, RH is the on resistance of the first switch, RL is the on resistance of the second switch, and Rind is the equivalent series resistance of the energy storage element.

Optionally, the second control signal is the inverse of the first control signal.

Optionally, the apparatus comprises a duplication module configured to generate a duplicated output voltage that is substantially unaffected by variations in the one or more of i) the load current, ii) the equivalent series resistance of the energy storage element, and iii) the turn on resistance of the first switch, wherein the controller is configured to receive the duplicated output voltage and to control the switching frequency using the duplicated output voltage.

Optionally, the controller is configured to control the switching frequency to maintain a substantially constant switching frequency irrespective of variations in the one or more of i) the load current, ii) the equivalent series resistance of the energy storage element, and iii) the turn on resistance of the first switch.

Optionally, the first control signal is configured to set the first switch to an on state for an on time and an off state for an off time, and the controller is configured to set the on time and/or the off time using the duplicated output voltage, thereby controlling the switching frequency such that the switching frequency is substantially unaffected by the variations.

Optionally, the controller is configured to control the switching frequency to maintain a substantially constant switching frequency irrespective of variations in the one or more of i) the load current, ii) the equivalent series resistance of the energy storage element, and iii) the turn on resistance of the first switch.

Optionally, the controller is configured to set the on time and/or off time using the input voltage and the duplicated output voltage.

Optionally, the switching converter comprises a buck converter comprising the first switch and a second switch, wherein the energy storage element comprises an inductor, and the controller is configured to provide a second control signal to the second switch, the control signal having the switching frequency.

Optionally, the controller is configured control the switching frequency such that the switching frequency is substantially unaffected by variations in a turn on resistance of the second switch.

Optionally, the first control signal is configured to set the first switch to an on state for an on time and an off state for an off time, and the controller is configured to set the on time and/or the off time using the duplicated output voltage, thereby controlling the switching frequency such that the switching frequency is substantially unaffected by the variations.

Optionally, the controller is configured to set the on time and/or off time using the input voltage and the duplicated output voltage.

Optionally, the on time as set by the controller is proportional to the duplicated output voltage divided by the input voltage.

Optionally, the duplication module comprises a duplicated power stage comprising a duplicate first switch.

Optionally, the duplication module comprises a filter stage coupled to the duplicated power stage.

Optionally, the duplication module comprises a voltage buffer coupled to the filter stage and configured to provide the duplicate output voltage.

Optionally, the first switch comprises a transistor.

Optionally, the transistor is a split gate field effect transistor.

Optionally, the energy storage element comprises an inductor.

Optionally, the switching converter is a DC-DC switching converter.

Optionally, the switching converter comprises a buck converter, a boost converter, or a buck-boost converter.

Optionally, the apparatus comprises the switching converter.

According to a second aspect of the disclosure there is provided a method of controlling a switching converter for receiving an input voltage and for providing an output voltage, the switching converter comprising a first switch and an energy storage element, the method comprising providing a first control signal to the first switch, the first control signal having a switching frequency, using a controller, and controlling the switching frequency, using the controller, such that the switching frequency is substantially unaffected by variations in one or more of i) a load current, ii) an equivalent series resistance of the energy storage element, and iii) a turn on resistance of the first switch.

It will be appreciated that the method of the second aspect may include features set out in the first aspect and can incorporate other features as described herein.

BRIEF DESCRIPTION OF THE DRAWINGS

The disclosure is described in further detail below by way of example and with reference to the accompanying drawings, in which.

DETAILED DESCRIPTION

A DC-DC switching converter, such as a buck or boost converter, may use basic constant on time (COT) or constant off time control. COT means that the "on time" of a switch in the converter is fixed during operation. The switching frequency is variable.

To stabilise the working frequency, an advanced COT converter will make the turn on time adaptive to the output voltage and input voltage, such that for a buck converter the on time Ton is proportional to the output voltage divided by the input voltage (Vout/Vin). A buck converter has a duty cycled D=Vout/Vin.

In known DC-DC switching converter designs, Vout will be the output voltage of the off-chip LC filter and such a voltage can be used to generate the on time Ton. However, in a physical implementation of the system, the output voltage Vout and the input voltage Vin will be affected by the load current, turn on resistance in the power stage of DC-DC converter, and the serial resistance of the inductor (DCR), which may be referred to as its equivalent series resistance.

A simulated practical implementation of a known system demonstrated that the measured switching frequency Fsw increases by approximately 10% as the load current changes from 2.5 A to 10 A as presented in following table.

| IL(load, A) | 2.5 | 5 | 9 | 10 |
|---|---|---|---|---|
| Fsw Measured(Khz) | 446.5 | 462.91 | 495.71 | 507.02 |

Figure 1A:
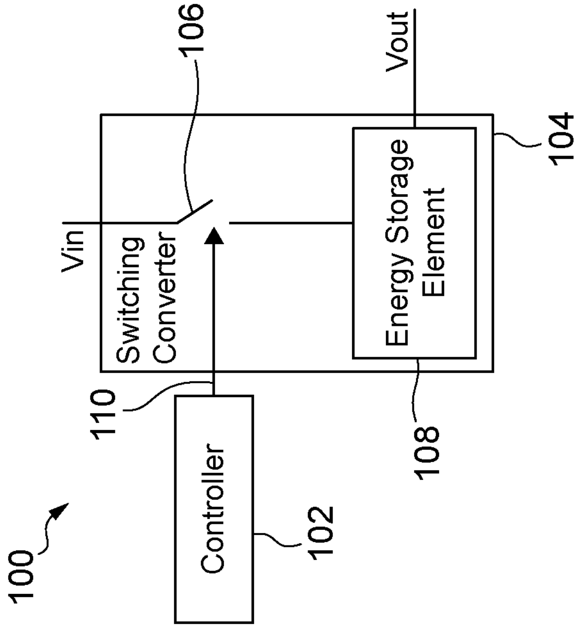
FIG. 1(*a*) is schematic of an apparatus in accordance with a first embodiment of the present disclosure, FIG. 1(*b*) is a schematic of an apparatus in accordance with a second embodiment of the present disclosure.
Figure 1B:
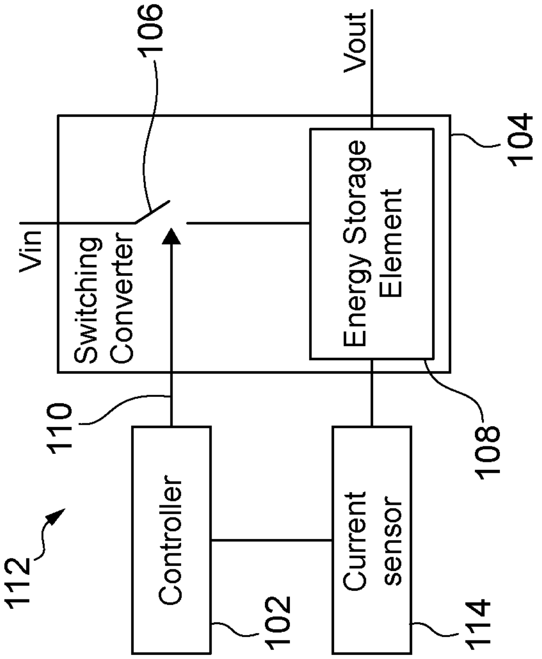

FIG. 1(*a*) is schematic of an apparatus 100 comprising a controller 102 for a switching converter 104, in accordance with a first embodiment of the present disclosure.

The switching converter 104 is configured to receive an input voltage Vin and to provide an output voltage Vout. The switching converter 104 comprises a switch 106 and an energy storage element 108.

The switching converter 104 may, for example, be a DC-DC switching converter and may be a buck converter, a boost converter or a buck-boost converter.

The controller 102 is configured to provide a control signal 110 to the switch 106. The switch 106 switches between an on state, where the switch 106 is closed and current is permitted to flow, and an off state, where the switch 106 is open and current is not permitted to flow, based on the control signal 110.

The control signal 110 has a switching frequency. During operation, the switch 106 receives the control signal 110 from the controller 102, and is periodically coupled and decoupled from the energy storage element 108 based on the switching frequency of the control signal 110. The energy storage element 108 may, for example, comprise an inductor. The switch 106 may comprise a transistor such as a split gate field effect transistor.

The controller 102 is configured to control the switching frequency such that the switching frequency is substantially unaffected by variations in at least one of a load current an equivalent series resistance of the energy storage element 108 a turn on resistance of the switch 106

The controller 102 may control the switching frequency to maintain a substantially constant switching frequency irrespective of variations in one or more of the aforementioned parameters.

The load current is the current provided by the switching converter 104 to a load, such as a resistive element, during operation.

The equivalent series resistance of the energy storage device 108 is a parameter used to model the internal resistance of an energy storage element 108, such as a capacitor or an inductor, in electronic circuits. It represents the total resistance that exists in series with the ideal storage element.

For inductors, equivalent series resistance represents the resistance in series with the inductance. This resistance comes from the resistance of the wire used to wind the inductor coil and any additional resistive losses in the core material. As with capacitors, equivalent series resistance in inductors is usually small enough to have no substantial effect on circuit operation but can be critical in certain high-frequency or high-performance circuits.

For capacitors, equivalent series resistance refers to the resistance present in series with the capacitance. In real-world capacitors, there is always some amount of inherent resistance due to the conductive properties of the dielectric material and the leads used to connect the capacitor to the circuit.

The turn on resistance of a switch 106 is the resistance of the switch 106 whilst it is in the on state.

Known control systems only consider the input voltage Vin and the output voltage Vout for the control of the switching frequency. This means that, in known systems, the switching frequency of the control signal 110 will vary if the load current, equivalent series resistance of the energy storage element 108 or the on resistance of the switch 106 varies.

The controller 102 of the present "Isc'osure enables the switching frequency to be controlled such that the switching frequency is substantially unaffected by one or more of the load current, the equivalent series resistance of the energy storage element 110, and the turn on resistance of the switch 106.

Therefore, the controller 102 of the present disclosure provides an improved switching converter controller, with optimised operation, when compared to known systems. In the present example, the switching converter 104 is optimized as a consistent switching frequency may be used that is, for example, independent of variations in the load current.

It will be appreciated that in the present example, the switching converter 104 comprises a single switch. However, in further embodiments, the controller 102 may operate a switching converter having two or more switches, with each switch receiving a control signal. The operation of such a system will be clear to the skilled person. In such embodiments, the controller 102 may be configured to control the switching frequency associated with each control signal such that the switching frequency is substantially unaffected by one or more of the aforementioned parameters.

The controller 102 may continuously monitor the output voltage Vout of the switching converter 104 and compare the output voltage Vout (or a feedback signal that is dependent on the output voltage) with a reference voltage that is representative of a desired output voltage. If there is a deviation between the output voltage (or the related feedback signal where used) and the reference value, the controller 102 provides a suitable control signal to adjust the operation of the converter 104 to bring the output voltage Vout closer to the desired level.

The controller 102 may employ control algorithms to determine the appropriate control signal 110 based on the feedback and reference values. These algorithms can be implemented using analog circuitry or digital signal processing techniques, depending on the complexity and requirements of the system, and in accordance with the understanding of the skilled person.

During operation, the control signal 110 may set the switch 106 to the on state for an on time and an off state for off time. The control signal 110 generated by the controller 102 defines the on time and the off time for the switch 106 to control the power flow and regulate the output voltage Vout.

The control signal 110 typically comprises of a series of digital pulses with specific timing characteristics, such as switching frequency (as discussed previously) and pulse width.

The controller 102 may be configured to control the switching frequency by setting the on time and/or off time provided by the control signal 110. The controller 110 may set the on time and/or off time based on one or more of the load current, the equivalent series resistance of the energy storage element 108 and the turn on resistance of the switch 106, thereby controlling the switching frequency such that the switching frequency is substantially unaffected by variations in at least one of these parameters.

The controller 102 may be configured to set the on time and/or off time using at least one of: the input voltage Vin, the output voltage Vout, the load current, the equivalent series resistance of the energy storage element 108 and the turn on resistance of the switch 106.

FIG. 1(*b*) is a schematic of an apparatus 112 comprising the controller 102 in accordance with a second embodiment of the present disclosure. The controller 102 may be configured to receive information on one or more of the load current, the equivalent series resistance of the energy storage element 108 and the turn on resistance of the switch 106. In the present example, the apparatus 112 comprises a current sensor 114 that is used to extract load current information which is then provided to the controller 102.

Figure 2B:
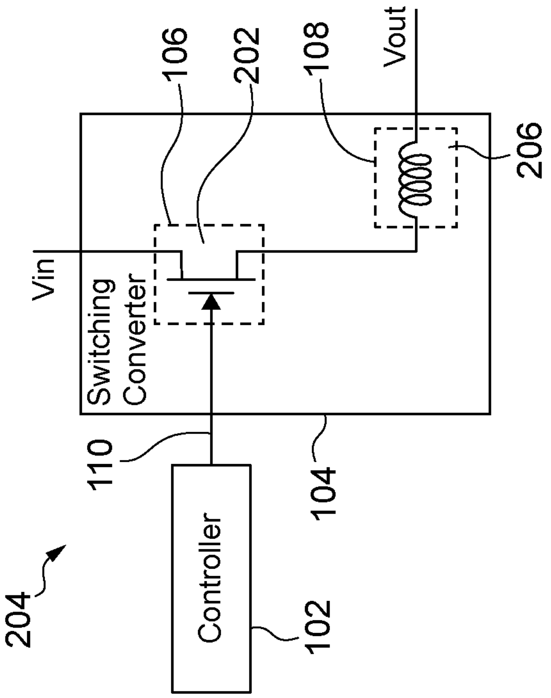
FIG. 2(*a*) is schematic of an apparatus, in accordance with a third embodiment of the present disclosure, FIG. 2(*b*) is schematic of an apparatus in accordance with a fourth embodiment of the present disclosure, FIG. 2(*c*) is a schematic of a further example of the apparatus of FIG. 2(*b*)
Figure 2A:
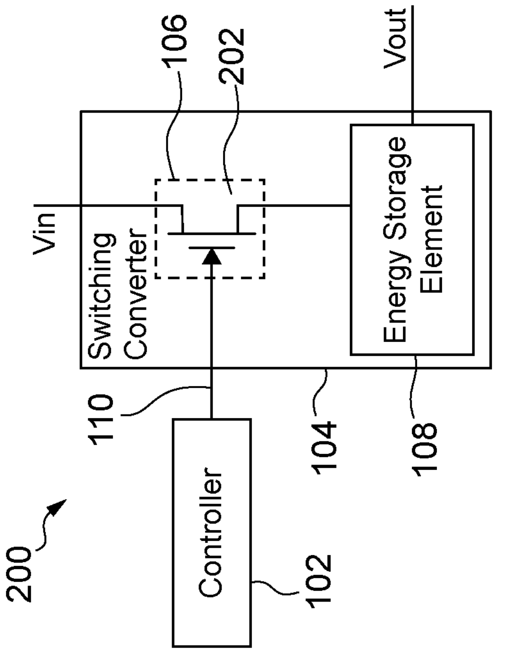
Figure 2C:
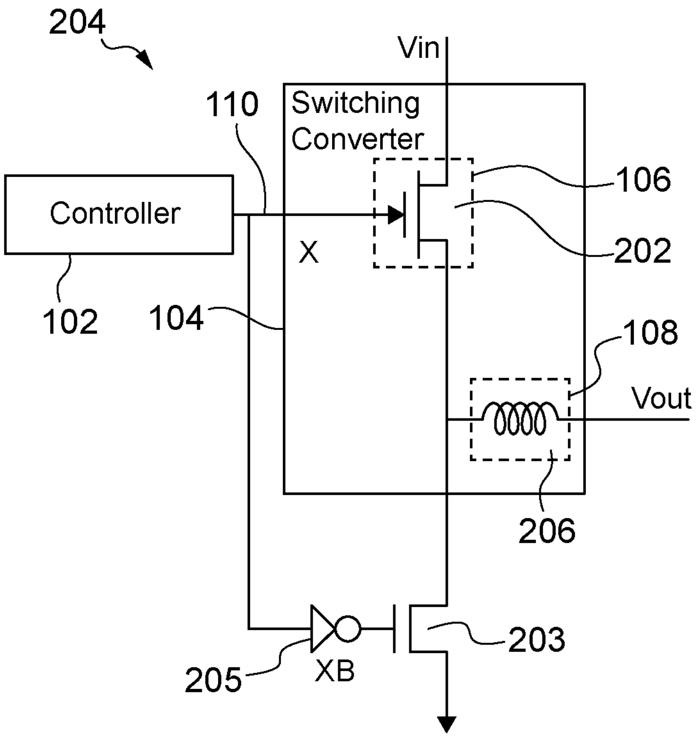

FIG. 2(*a*) is schematic of an apparatus 200, in accordance with a third embodiment of the present disclosure. The apparatus 200 comprises the controller 102 for the switching converter 104. In the present embodiment, the switch 106 comprises a field effect transistor 202 that is coupled to the energy storage element 108 and, during operation, receives the control signal 110 from the controller 102.

The field effect transistor 202 may be a Metal-Oxide-Semiconductor FETs (MOSFETs). The field effect transistor 202 may, for example, be a split gate field effect transistor and may comprise a control gate and a floating gate.

FIG. 2(*b*) is schematic of an apparatus 204, in accordance with a fourth embodiment of the present disclosure. The apparatus 204 comprises the controller 102 for the switching converter 104. In the present embodiment, the energy storage element 108 comprises an inductor 206.

It would be appreciated, that the inductor 206 may be a passive electronic component used in an electrical circuit to store and release energy in the form of a magnetic field, typically, but not limited to, being made of a coil of wire wound around a core material and having an inductance.

FIG. 2(*c*) is an schematic of a further example of the apparatus 204. In the present example the switching converter 104 comprises a low side switch 203, which is on when switch 202 is off; and an inverter 205. It will be appreciated that this is general practice in buck converter design.

Figure 3A:
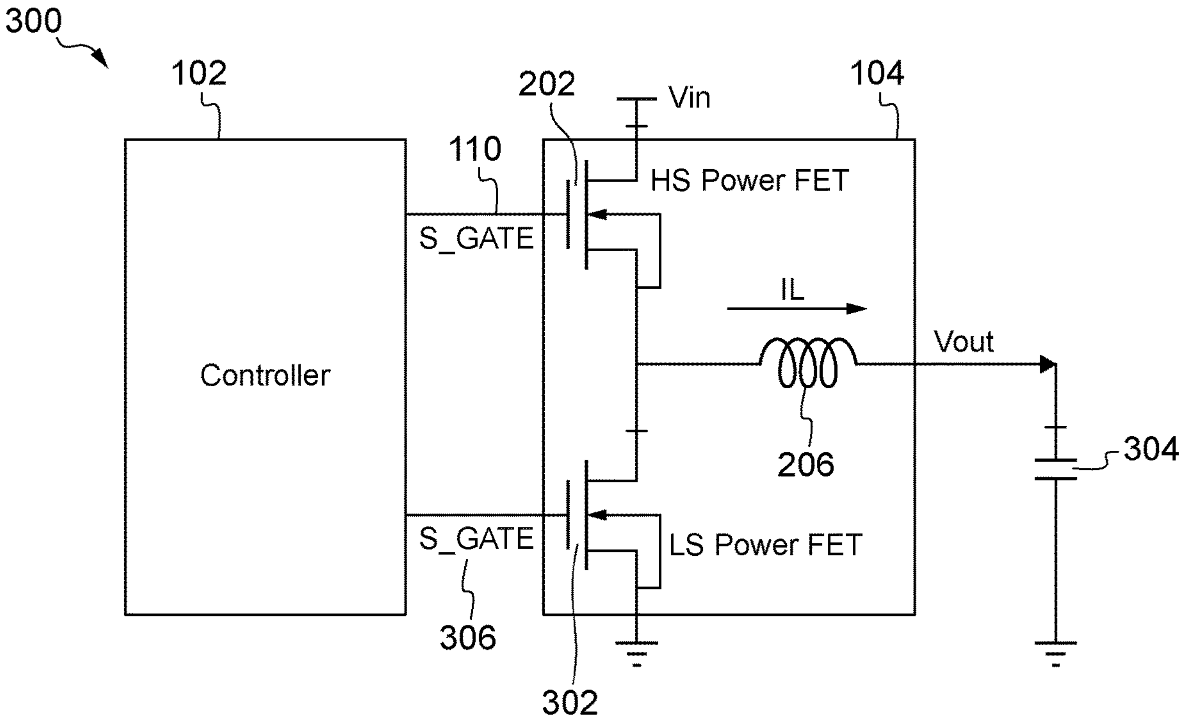
FIG. 3(*a*) is a schematic of an apparatus in accordance with a fifth embodiment of the present disclosure, FIG. 3(*b*) is a schematic of a buck converter to show the basic theory of a buck converter, FIG. 3(*c*) is a timing graph showing the operation of the buck converter of FIG. 3(*b*)
Figure 3B:
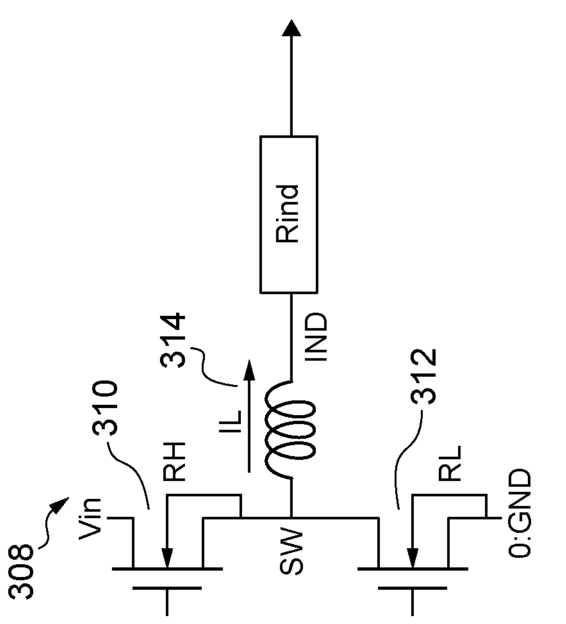
Figure 3C:
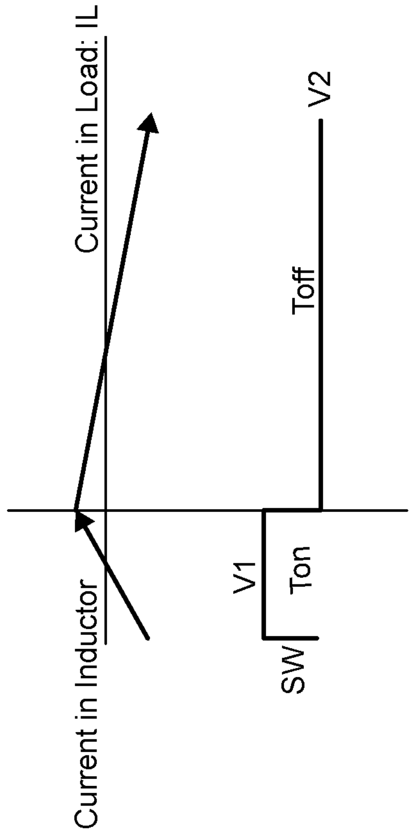

FIG. 3(*a*) is a schematic of an apparatus 300, in accordance with a fifth embodiment of the present disclosure. In the present embodiment, the switching converter 104 comprises a buck converter which comprises a switch 302. The switching converter 104 is coupled to an output capacitor 304. The switch 302, may correspond to the switch 203 as previously described.

A buck converter, also known as a step-down converter, is a type of DC-DC switching converter that reduces the voltage from a higher level to a lower level. The buck converter is widely used in electronic devices to provide stable and regulated lower voltages required for powering various components.

In an alternative embodiment, the switching converter 104 may be a boost converter, also known as a step-up converter. A boost converter is a DC-DC switching converter used to efficiently increase the voltage from a lower level to a higher level. It is widely employed in various electronic applications where a higher output voltage is required than the available input voltage.

In a further embodiment, the switching converter 104 may be a buck-boost converter.

The switching converter 104 of the apparatus 300 uses with a dual-switch gate configuration; the controller 102 is used to regulate the operation of the dual-switch gate switching converter.

The controller 102 is configured to provide a control signal 306 to the switch 302. The control signal 306 may vary at the switching frequency.

The controller 102 controls the switching of two power semiconductor switches 202, 302 by providing control signals 110, 306 to the switching converter 104. The dual-switch gate switching converter 102 may also be referred to as a “dual active bridge” converter or a “dual bridge” converter.

In a dual-switch gate switching converter 102, there is a pair of power switches 202, 302 arranged in a bridge configuration. The pair comprises of a high-side switch (provided by the switch 202, and connected to the input voltage Vin) and a low-side switch (provided by the switch 302 and connected to a ground terminal).

The controller 102 may be configured to control the switching frequency such that the switching frequency is substantially unaffected by variations in a turn on resistance of the switch 302.

The controller 102 may be configured to set the on time and/or the off time of one or both of the control signals 110, 306 based on one or more of the load current IL, the equivalent series resistance of the energy storage element 206, the turn on resistance of the switch 202, and the turn on resistance of the switch 302.

The controller 102 may be configured to control the switching frequency to maintain a substantially constant switching frequency irrespective of variations in the load current, the equivalent series resistance of the energy storage element 206, the turn on resistance of the switch 202, and the turn on resistance of the switch 302.

The controller 102 may be configured to set the on time and/or off time using the input voltage Vin, the output voltage Vout, the load current IL, the equivalent series resistance of the energy storage element 206, the turn on resistance of the switch 202 and the turn on resistance of the switch 302.

FIG. 3(*b*) is a schematic of a buck converter 308 to show the basic theory of a buck converter. The buck converter comprises switches 310, 312; and inductor 314; and a resistance Rind. FIG. 3(*c*) is a timing graph showing the operation of the buck converter 308 of FIG. 3(*b*).

In Ton, the high side switch 310 turns on with a resistance RH and the low side switch 312 is off. in Toff time, the low side switch 312 turns on with a resistance RL and the high side switch 310 is off.

In Ton time, a voltage on the left side of inductor (SW) is:

$$SW = VIN - IL * RH \tag{1}$$

A voltage on the right side of inductor (IND) is:

$$IND = VOUT + IL * Rind \tag{2}$$

and the current in the inductor 314 will rise.

$$Irise = \frac{(VIN - RH * IL) - (Vout + IL * Rind)}{L} \times Ton \tag{3}$$

Where Il is the average current in the inductor, L is the inductance of the inductor.

In Toff time, since the current in inductor cannot change the direction, voltage on the left side of inductor (SW) is:

$$SW = -IL * RL \tag{4}$$

voltage on the right side of inductor (IND) is:

$$IND = VOUT + IL * RL \tag{5}$$

the current in inductor will fall $$Ifall = \frac{(Vout + IL * Rind) - (-IL * RL)}{L} \times Toff \tag{6}$$

Since the Buck converter works in a stable condition, which means the beginning of current and the ending of current in the inductor are equal, which makes:

$$Ifall - Irise \tag{7}$$

$$\frac{(VIN - RH * IL) - (Vout + IL * Rind)}{L} \times Ton = \frac{(Vout - IL * Rind) - (-IL * RL)}{L} \times Toff \tag{8}$$

Also, $$Toff = \frac{1}{FSW} - Ton \tag{9}$$

By merging equation (8) and (9), in the present embodiment, the switching frequency Fsw to be provided by one or both of the control signals 110, 306 may be calculated by the following equation:

$$Fsw = \frac{Vout + IL(Rind + RL)}{(Vin - IL \times DeltaR)} \times \frac{1}{Ton} \tag{10}$$

where:

$$DeltaR = RH - RL \tag{11}$$

Vin and Vout are the input voltage and output voltage, respectively; IL is the load current; and Ton is the on time of the switch 202 as provided by the control signal 110. For a constant switching frequency Fsw that is independent of variations in load current IL, the equivalent series resistance of the switches 202, 302 and the equivalent series resistance of the inductor 206, a stable Fsw will be achieved if Ton is as follows:

$$Ton \propto \frac{Vout + IL(Rind + RL)}{(Vin - IL \times Delta\ R)} \tag{12}$$

where RH is the on resistance of the high side switch 202; RL is the on resistance of the low side switch 302; and Rind is the DC resistance of the inductor 206 (which corresponds to its equivalent series resistance).

Therefore, with reference to equations (1)-(12) it can be observed that for the apparatus 300, the switching frequency Fsw can be set by considering the load current IL, the switch resistances RH, RL and the equivalent series resistance of the inductor Rind. Using this information, the controller 102 can then provide a constant switching frequency of the switching operation irrespective of changes in load current IL. In the present example, the controller 102 may receive and use information on the load current IL, to set the control signals 110, 306 for the operation of the switches 202, 302.

It will be appreciated that information on the load current IL, the switch resistances RH, RL and the equivalent series resistance of the inductor Rind may be provided as inputs to the controller 102. For example, the apparatus 300 may comprise the current sensor 114, as discussed previously, for detecting the load current IL.

As the switch 302 is intended to be in an on state when the switch 202 is in an off state, and in an off state when the switch 202 is in an on state, the control signal 306 may be the inverse of the control signal 110, such that the on time as provided by the control signal 110 corresponds to the off time provided by the control signal 306. This functionality may be provided by providing the control signal 110 (or a signal having the properties of the control signal 110) through an inverter to generate the control signal 306. Alternatively, the switch 302 may be of a different type to the switch 202 such that the state of a control signal that enables one of the switches 202, 302 acts to disable the other and vice versa—in such an example, the control signals 110, 306 may be identical. It will be appreciated that the required functionality may be provided in other ways, in accordance with the understanding of the skilled person.

It will be appreciated that the controller 102 may comprise a gate driver (not shown) for outputting the control signals 110, 306 such that they are suitable for switching the switches 202, 302.

Figure 4B:
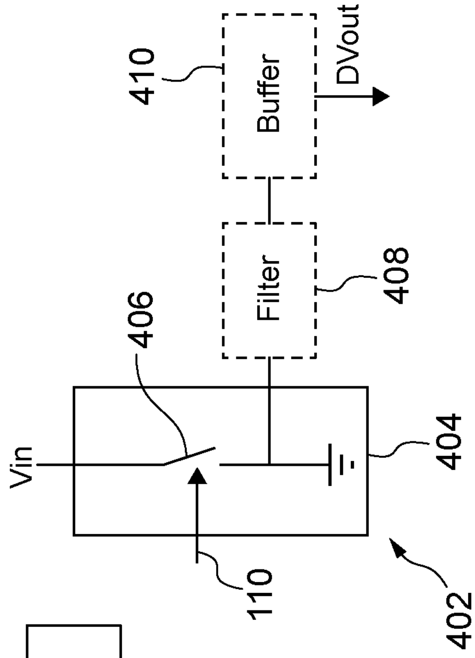
FIG. 4(*a*) is a schematic of an apparatus, in accordance with a sixth embodiment of the present disclosure, FIG. 4(*b*) is a schematic of a specific embodiment of the duplication module, FIG. 4(*c*) is a schematic of an apparatus in accordance with a seventh embodiment of the present disclosure.
Figure 4A:
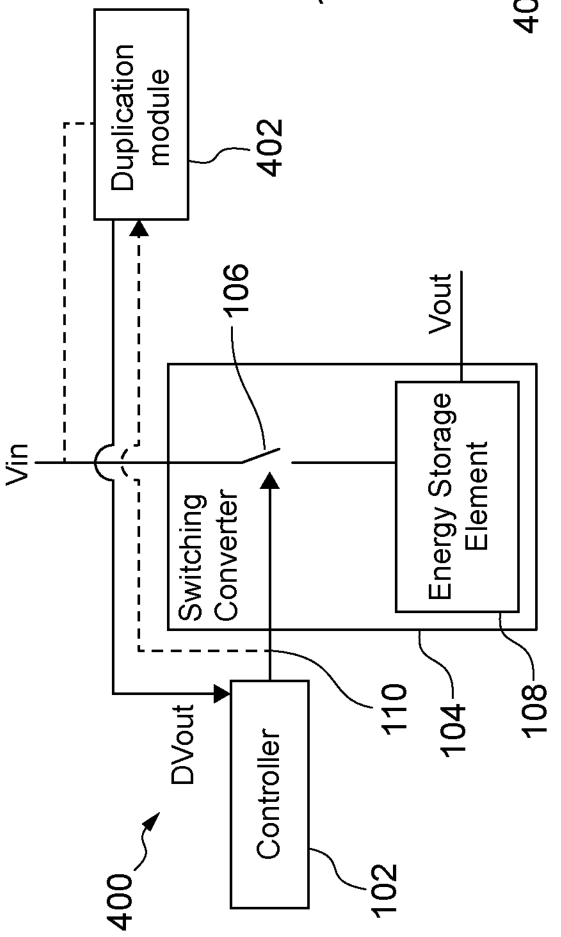
Figure 4C:
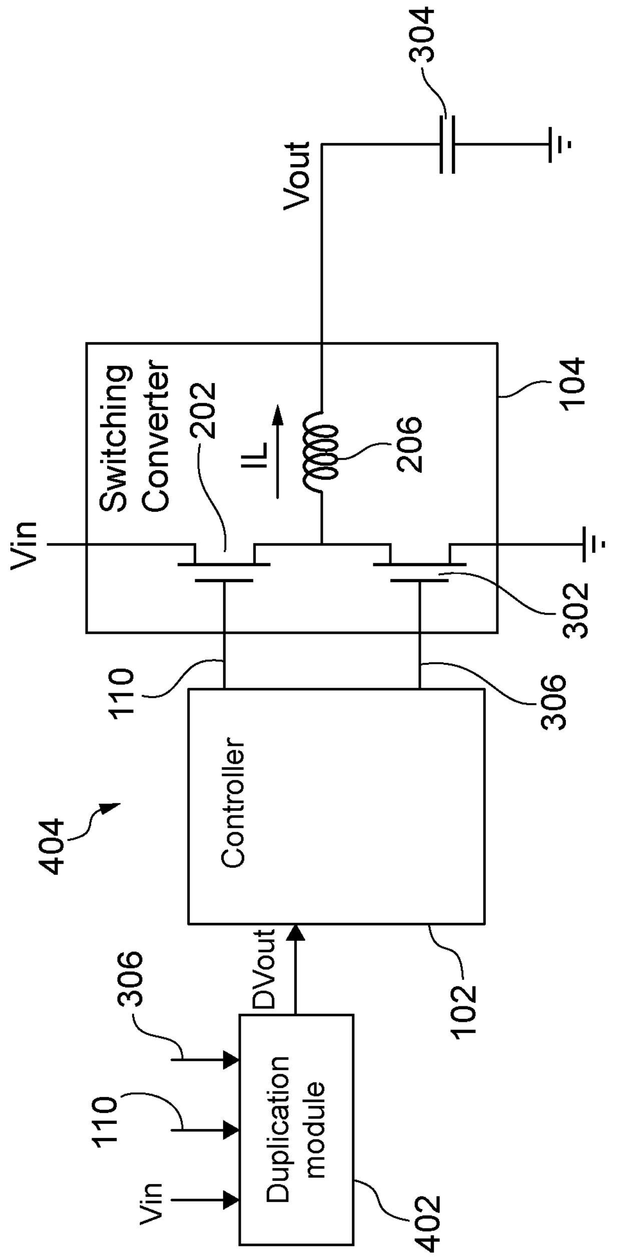

FIG. 4(*a*) is a schematic of an apparatus 400, in accordance with a sixth embodiment of the present disclosure. In the present embodiment, the apparatus 400 comprises a duplication module 402 that is configured to generate a duplicated output voltage DVout that is substantially unaffected by variations in the one or more of the load current, the equivalent series resistance of the energy storage element 108, and the turn on resistance of the switch 106. The controller 102 is configured to receive the duplicated output voltage DVout and to control the switching frequency using the duplicated output voltage DVout.

The duplication module 402 may be coupled to the input voltage Vin and receive the control signal 110 for the generation of the duplicated output voltage DVout.

The duplication module 402 duplicates features of the switching converter 104, but is not susceptible to the variations in the load current IL, and/or the equivalent series resistance of the energy storage element 108, and/or the turn on resistance of the switch 106, of the switching converter 104, and therefore can be used to generate the duplicated output voltage DVout, which corresponds to the idealised output voltage Vout that would occur if the switching converter's 104 operation was insensitive to the above parameters. Therefore, DVout can be used to set the on time and/or the off time of the control signal 110.

In a specific example, both the duplicated output voltage DVout and the input voltage Vin may be used to set the on time and/or the off time.

The switching converter 104 may include any of the features discussed herein in relation to other embodiments of the present disclosure. For example, the switching converter 104 may be a DC-DC converter and may comprise a buck converter, a boost converter or a buck-boost converter. Furthermore, the switching converter 104 may comprise a second switch, such as presented in the apparatus 300, with the control signal 110 being controlled such that the switching frequency is substantially unaffected by variations in the turn on resistance of the second switch.

The following examples are described in relation to a buck converter. However, in further embodiments the system can be adapted for operation with other switching converters, as will be clear to the skilled person.

FIG. 4(*b*) is a schematic of a specific embodiment of the duplication module 402 as may be implemented any of the embodiments described herein in accordance with the understanding of the skilled person. The duplication module 402 comprises a duplicated power stage 404 that is used to duplicate the characteristics of the power stage of the switching converter 104. In the present example the duplicated power stage 404 comprises a duplicate switch 406 that is a "duplicate" of the switch 106.

By "duplicate" it is meant that the duplicate switch 406 has the same physical properties of the switch 106 such that it will exhibit the same electrical performance of the switch 106.

"Duplicate" may also, for example, refer to a case where the switch 406 does not have the same physical properties as the switch 106, but instead has properties that result in electrical characteristics of the switch 406 that are scaled in relation to the electrical properties of the switch 106, and are therefore still sufficient for generating a suitable duplicated voltage DVout. The scaling may, for example, be compensated in the generation of the on time and/or the off time.

The duplication module 402 may comprise a filter stage 408 for filtering the duplicated output voltage DVout, for example, to filter out unwanted frequency components. The filter stage 408 may comprise a component, or combination of components, used attenuate the frequency thereby reducing the unwanted noise, ripple, or harmonics in the duplicated output voltage DVout.

The filter stage 408 may comprise an LC Filter comprising at least one inductor and at least one capacitor forming an LC filter, thereby providing filtering characteristics and reducing voltage ripple and harmonics in the duplicated output voltage DVout.

The duplication module 404 may further comprise a voltage buffer circuit 410.

FIG. 4(*c*) is a schematic of an apparatus 410 in accordance with a seventh embodiment of the present disclosure. In the present embodiment, the switching converter 104 comprises a buck converter. The controller 102 is configured to set the on time and/or off time using the input voltage Vin and the duplicated output voltage DVout. The on time set by the controller may be proportional to the duplicated output voltage DVout divided by the input voltage Vin.

In summary, the duplication module 402 may refer to the "replication" or "duplication" of one or more semiconductor power switches and associated components to create multiple identical power stages within a system. The duplication module 402 may operate independently and in parallel to the switching converter 104.

The duplication module 402 avoids needing to directly measure the load current IL. In particular, it generates a duplicate output voltage DVout that corresponds to the output voltage Vout but is independent of the load current IL of switching converter 104.

Figure 5:
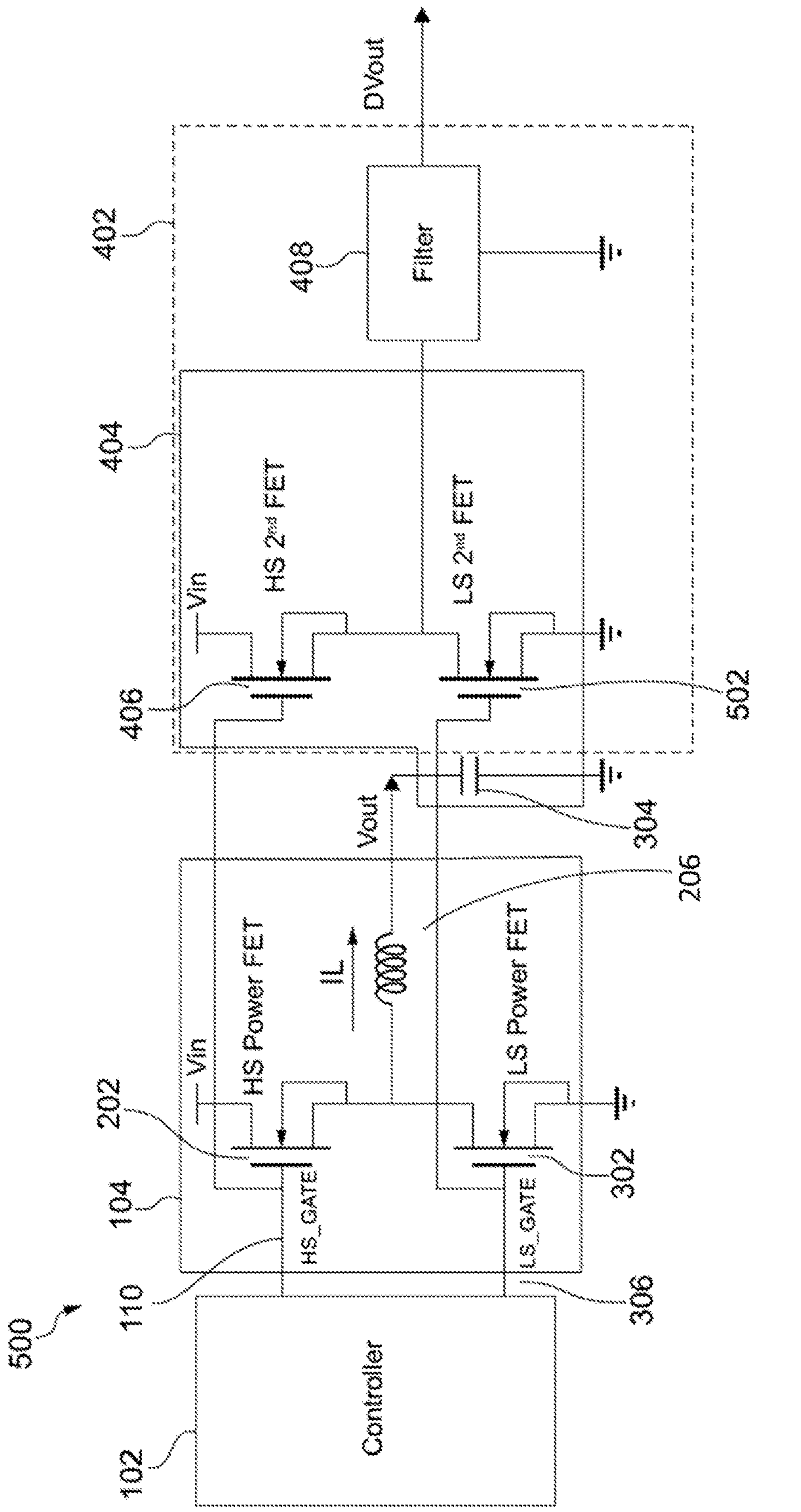
FIG. 5 is a schematic of an apparatus in accordance with an eighth embodiment of the present disclosure.

FIG. 5 is a schematic of an apparatus 500 in accordance with an eighth embodiment of the present disclosure. In the present embodiment, the duplicated power stage 404 comprises the duplicate switch 406 that is a "duplicate" of the switch 202 and a duplicate switch 502 that is a "duplicate" of the switch 302.

Instead of sensing the load current IL for compensation of the voltage drift on Vout, the present embodiment uses a second power stage 404 without any DC current passing in it. The filtered output DVout may be used to generate the on time Ton.

Figure 6:
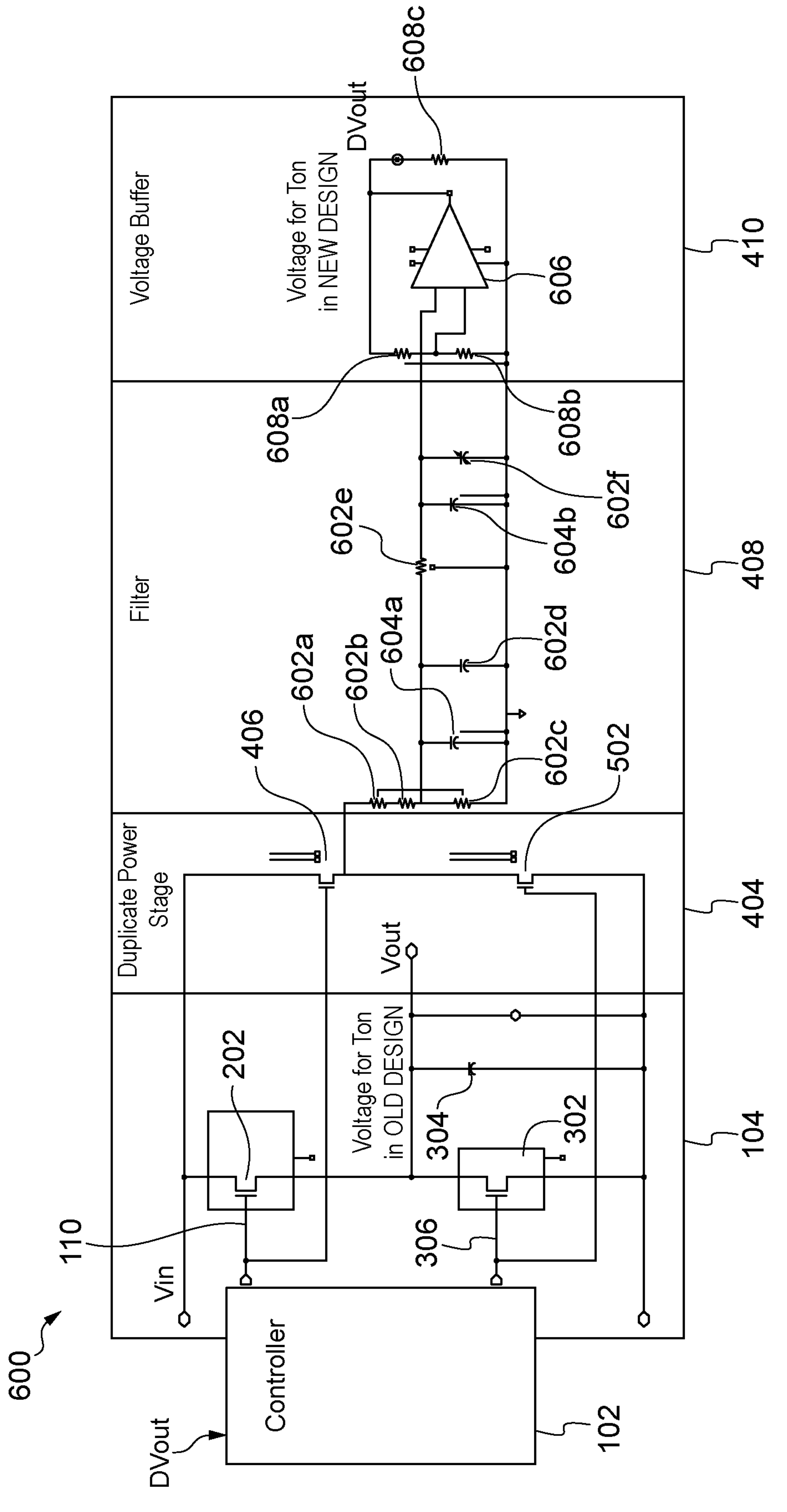
FIG. 6 is a schematic of an apparatus in accordance with a ninth embodiment of the present disclosure.

FIG. 6 is a schematic of an apparatus 600 in accordance with an ninth embodiment of the present disclosure. In the present embodiment, the filter stage 408 comprises resistors 602*a*, 602*b*, 602*c*, 602*d*, 602*e*, 602*f* and a capacitor 604*a*, 604*b*. In the present embodiment, the buffer circuit 410 comprises a differential amplifier 606 and resistors 608*a*, 608*b*, 608*c*.

In the present example, the duplicated power stage 404 and filter stage 408 may be implemented "on-chip". The output of the filter stage 408 will be used to generate the on time Ton using the controller 102. As there will be no high load current passing the duplicated power stage 404, the frequency of whole DC-DC converter 104 will not be affected by the on resistance in the main power stage of the converter 104, equivalent series resistance (DCR) of the inductors and the load current IL.

Figure 7:
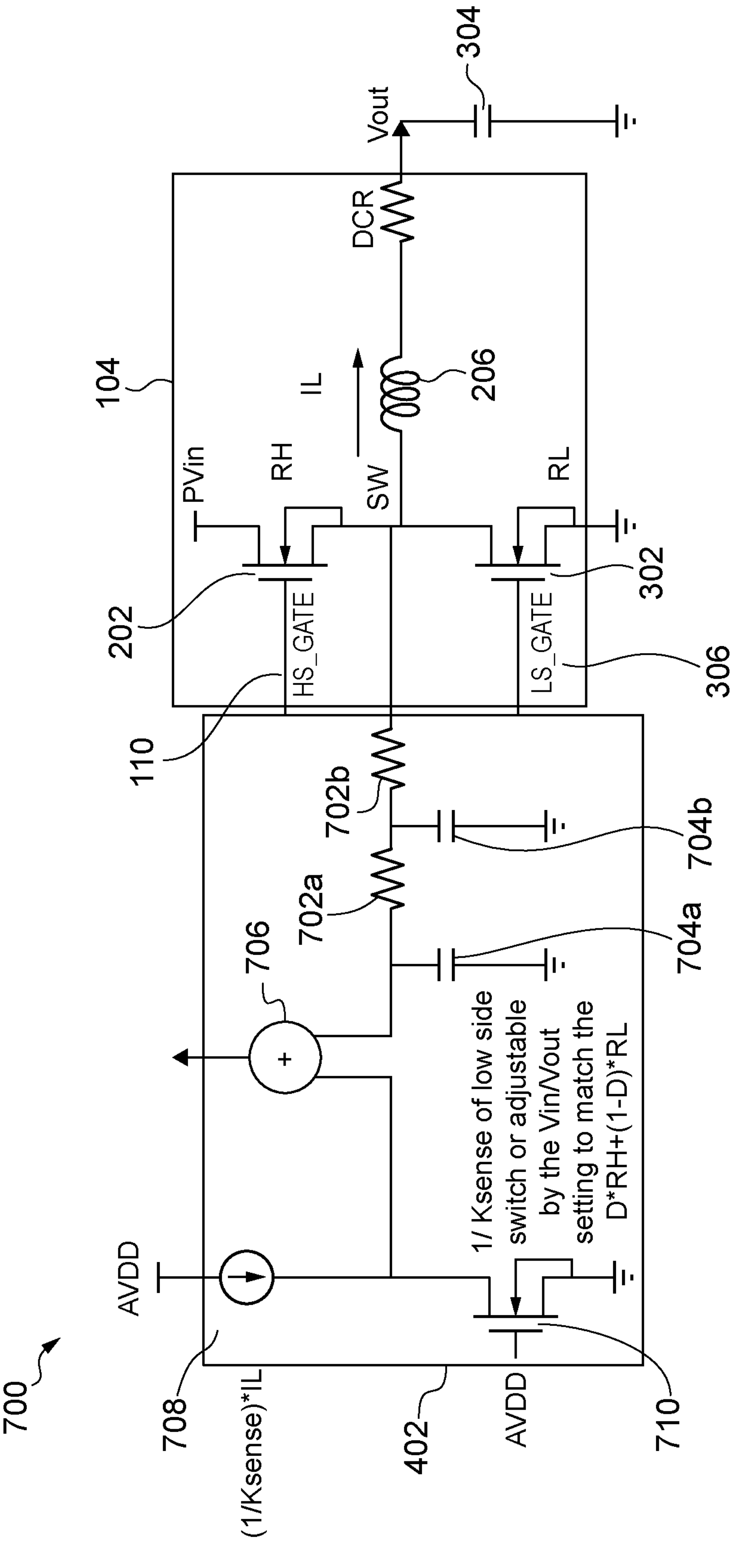
FIG. 7 is a schematic of an apparatus in accordance with a tenth embodiment of the present disclosure.

FIG. 7 is a schematic of an apparatus 700 in accordance with a tenth embodiment of the present disclosure. In the present embodiment, the duplication module 402 comprises resistors 702*a*, 702*b*; capacitors 704*a*, 704*b*; a summing circuit 706; a current source 708 and a transistor 710. "DCR" denotes the equivalent series resistance of the inductor 206.

Figure 8:
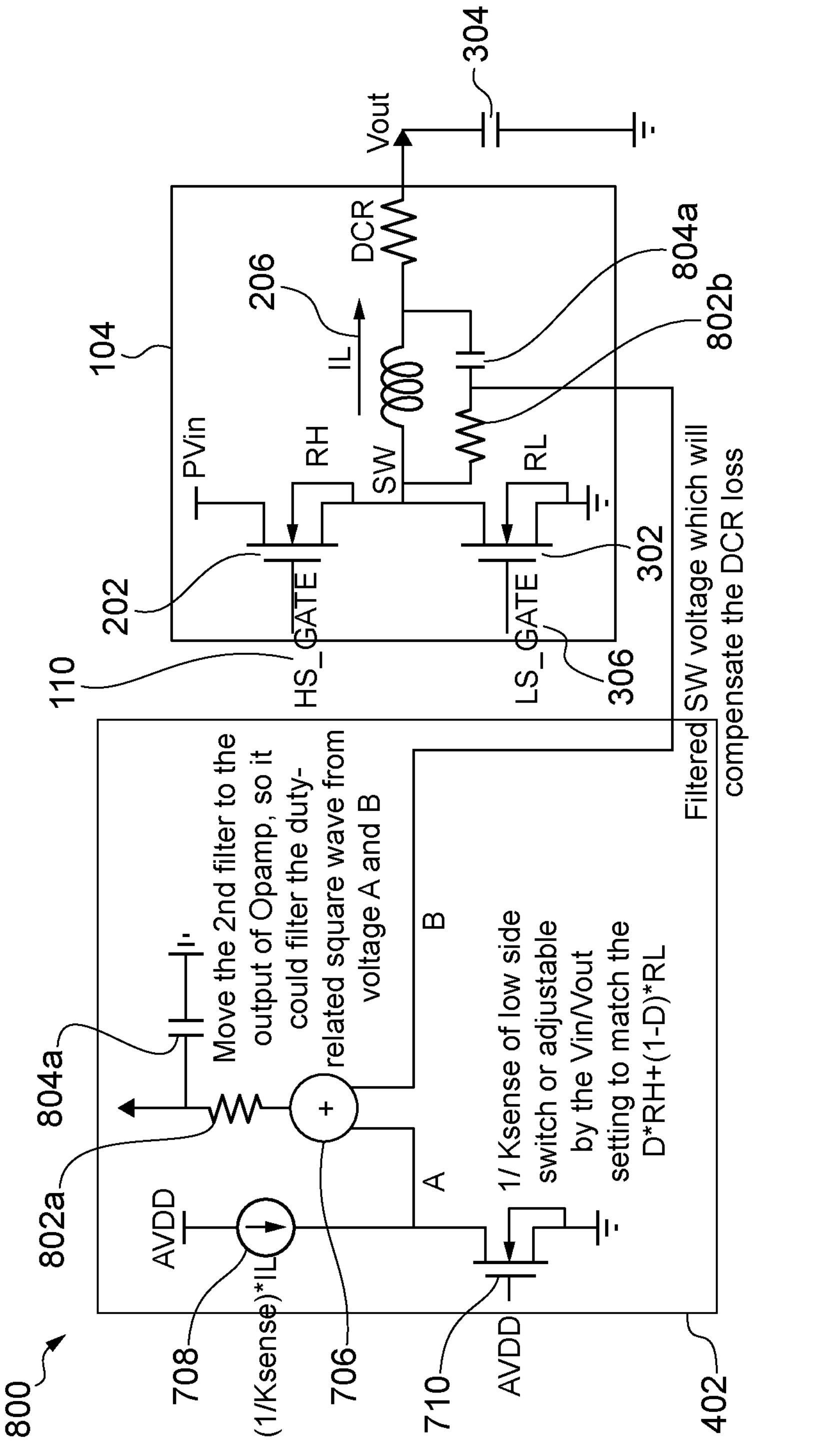
FIG. 8 is a schematic of an apparatus in accordance with a eleventh embodiment of the present disclosure.

FIG. 8 is a schematic of an apparatus 800 in accordance with a eleventh embodiment of the present disclosure. In the present embodiment, the duplication module 402 comprises resistors 802*a*, 802*b*; and capacitors 804*a*, 804*b*; and the current source 708 and the transistor 710.

Figure 9:
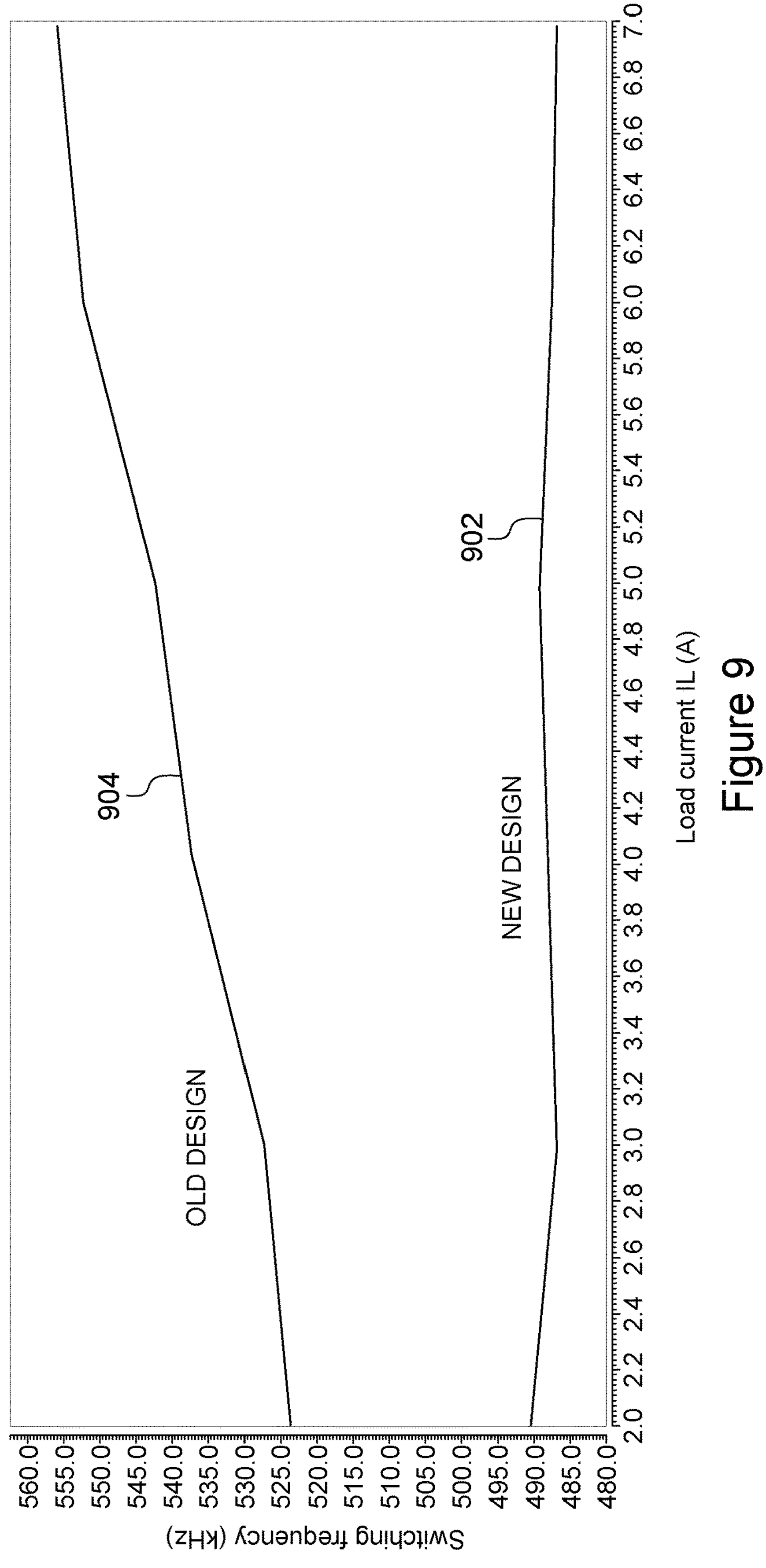
FIG. 9 is a frequency graph showing simulation results for a practical implementation of the apparatus of FIG. 6 and a practical implementation of existing systems that are susceptible to variations in load current.

FIG. 9 is a frequency graph showing simulation results for a practical implementation of the apparatus 600 of FIG. 6 (a trace 902) and a practical implementation of existing systems that are susceptible to variations in load current (a trace 904).

It can be observed that the apparatus 600 of the present disclosure demonstrates less variation in switching frequency as load current varies, when compared with existing systems.

Figure 10:
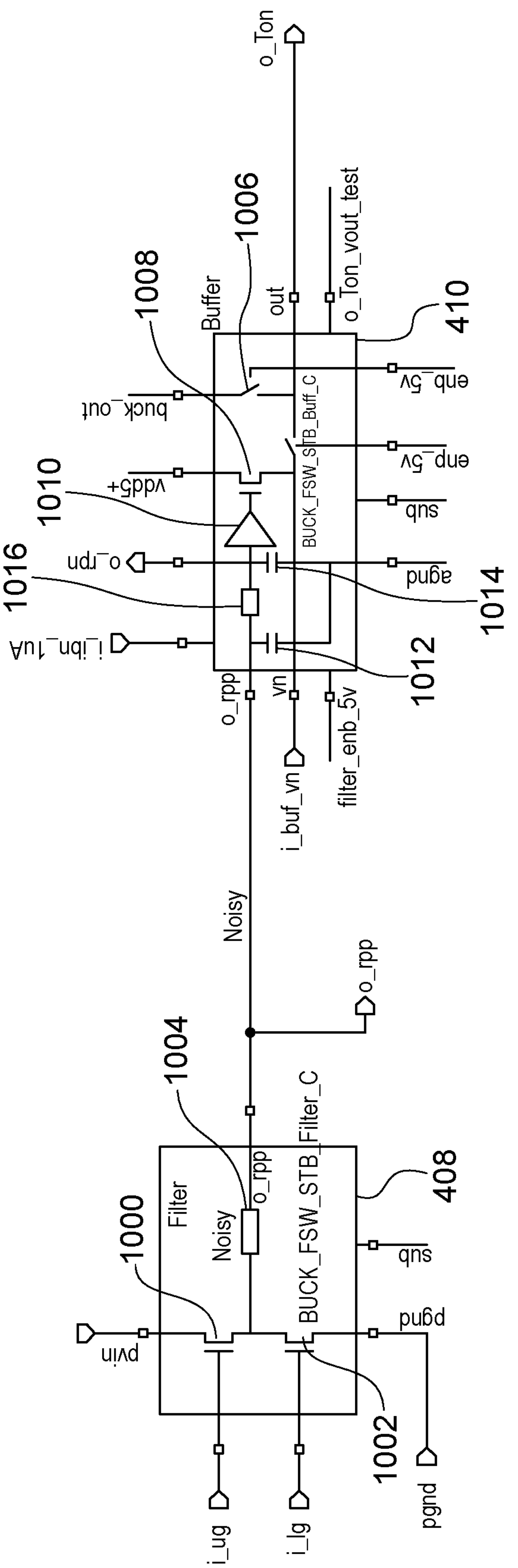
FIG. 10 is a schematic showing example specific implementations of the filter stage and the voltage buffer circuit.

FIG. 10 is a schematic showing example specific implementations of the filter stage 408 and the voltage buffer circuit 410. The filter comprises switches 1000, 1002 and a resistor 1004; and the buffer circuit 410 comprises switches 1006, 1008; an amplifier 1010; capacitors 1012, 1014; and a resistor 1016.

Figure 11:
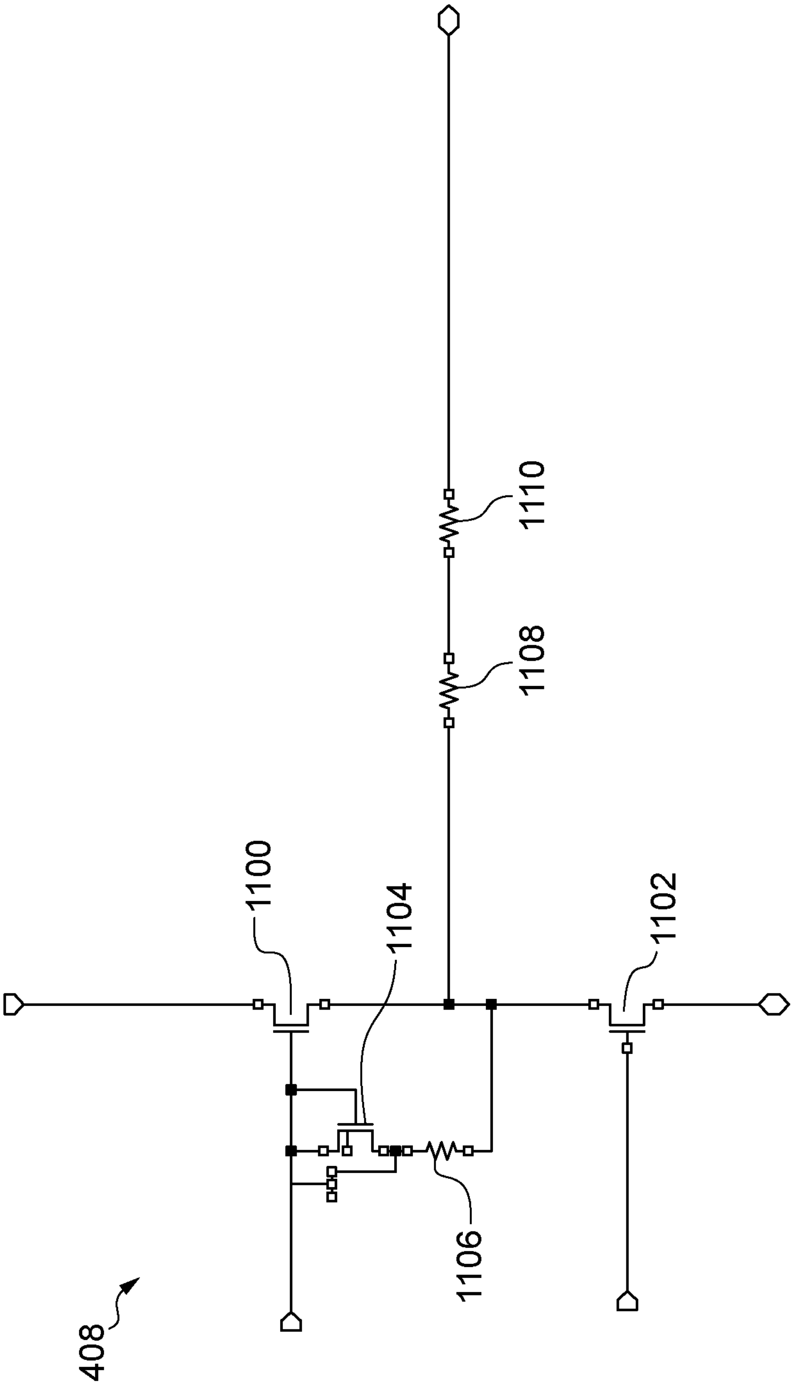
FIG. 11 is a schematic showing a further example specific implementation of the filter stage.

FIG. 11 is a schematic showing a further example specific implementation of the filter stage 408 comprising switching cells 1100, 1102; a transistor 1104; and resistors 1106, 1108, 1110. The switching cells 1100, 1102 create a duplicated SW signal as V1.

Figure 12:
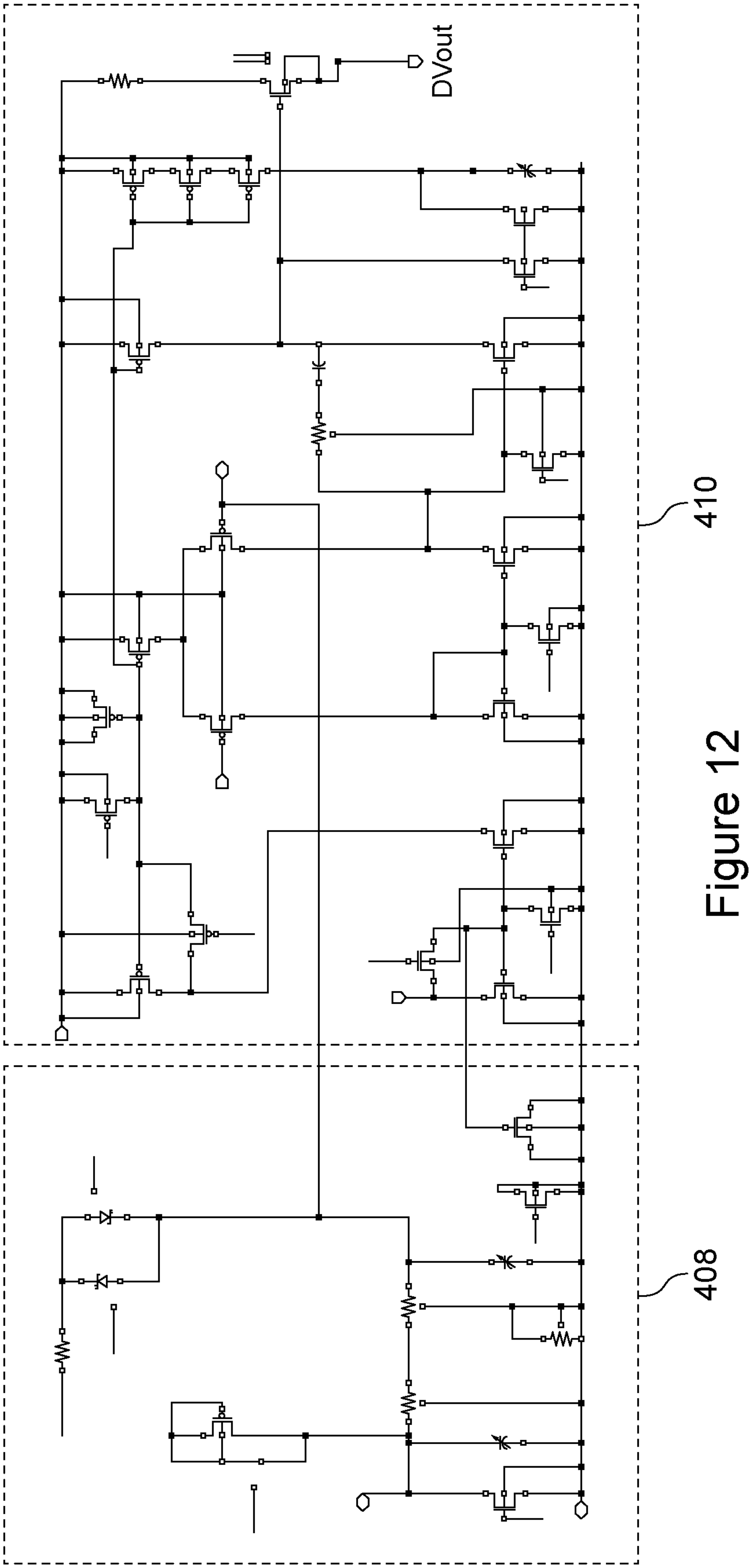
FIG. 12 is a schematic showing a further example specific implementation of the filter stage and the voltage buffer circuit.

FIG. 12 is a schematic showing a further example specific implementation of the filter stage 408 and the voltage buffer circuit 410. The filter stage 408 functions as an RC filter; and the buffer circuit 410 is a CMOS voltage buffer. In the buffer circuit 410, two series connected RC filters will filter the output of the filter stage 408 to V3 which may be a duplicated version of VOUT in equation (12). A CMOS voltage buffer is designed to improve the drivability of V3.

Various improvements and modifications may be made to the above without departing from the scope of the disclosure.

The invention claimed is:

1. An apparatus comprising a controller for a switching converter for receiving an input voltage and for providing an output voltage, the switching converter comprising a first switch and an energy storage element, the controller being configured to:

provide a first control signal to the first switch, the first control signal having a switching frequency; and control the switching frequency such that the switching frequency is substantially unaffected by variations in one or more of:

i) a load current;

ii) an equivalent series resistance of the energy storage element; and iii) a turn on resistance of the first switch.

2. The apparatus of claim 1, wherein the controller is configured to:

control the switching frequency to maintain a substantially constant switching frequency irrespective of variations in the one or more of:

i) the load current;

ii) the equivalent series resistance of the energy storage element; and iii) the turn on resistance of the first switch.

3. The apparatus of claim 1, wherein:

the first control signal is configured to set the first switch to an on state for an on time and an off state for an off time; and the controller is configured to:

set the on time and/or the off time based on one or more of the:

i) the load current;

ii) the equivalent series resistance of the energy storage element; and iii) the turn on resistance of the first switch;

thereby controlling the switching frequency such that the switching frequency is substantially unaffected by the variations.

4. The apparatus of claim 1, wherein:

the switching converter comprises a buck converter comprising the first switch and a second switch, wherein the energy storage element comprises an inductor; and the controller is configured to provide a second control signal to the second switch, the control signal having the switching frequency.

5. The apparatus of claim 4, wherein the controller is configured control the switching frequency such that the switching frequency is substantially unaffected by variations in a turn on resistance of the second switch.

6. The apparatus of claim 5, wherein:

the first control signal is configured to set the first switch to an on state for an on time and an off state for an off time; and the controller is configured to:

set the on time and/or the off time based on the load current, the equivalent series resistance of the energy storage element, the turn on resistance of the first switch, and the turn on resistance of the second switch, thereby controlling the switching frequency such that the switching frequency is substantially unaffected by the variations.

7. The apparatus of claim 6, wherein the controller is configured to control the switching frequency to maintain a substantially constant switching frequency irrespective of variations in the load current, the equivalent series resistance of the energy storage element, the turn on resistance of the first switch, and the turn on resistance of the second switch.

8. The apparatus of claim 7, wherein the controller is configured to set the on time and/or off time using the input voltage, the output voltage, the load current, the equivalent series resistance of the energy storage element, the turn on resistance of the first switch and the turn on resistance of the second switch.

9. The apparatus of claim 8, wherein the on time as set by the controller is proportional to $$\frac{Vout + IL \times (Rind + RL)}{Vin - IL \times (RH - RL)},$$

where Vin is the input voltage, IL is the load current, RH is the on resistance of the first switch, RL is the on resistance of the second switch, and Rind is the equivalent series resistance of the energy storage element.

10. The apparatus of claim 1, comprising:

a duplication module configured to generate a duplicated output voltage that is substantially unaffected by variations in the one or more of:

i) the load current;

ii) the equivalent series resistance of the energy storage element; and iii) the turn on resistance of the first switch; wherein:

the controller is configured to receive the duplicated output voltage and to control the switching frequency using the duplicated output voltage.

11. The apparatus of claim 10, wherein:

the first control signal is configured to set the first switch to an on state for an on time and an off state for an off time; and the controller is configured to set the on time and/or the off time using the duplicated output voltage, thereby controlling the switching frequency such that the switching frequency is substantially unaffected by the variations.

12. The apparatus of claim 10, wherein:

the switching converter comprises a buck converter comprising the first switch and a second switch, wherein the energy storage element comprises an inductor; and the controller is configured to provide a second control signal to the second switch, the control signal having the switching frequency.

13. The apparatus of claim 12, wherein the controller is configured control the switching frequency such that the switching frequency is substantially unaffected by variations in a turn on resistance of the second switch.

14. The apparatus of claim 13, wherein:

the first control signal is configured to set the first switch to an on state for an on time and an off state for an off time; and the controller is configured to:

set the on time and/or the off time using the duplicated output voltage, thereby controlling the switching frequency such that the switching frequency is substantially unaffected by the variations.

15. The apparatus of claim 14, wherein the controller is configured to set the on time and/or off time using the input voltage and the duplicated output voltage.

16. The apparatus of claim 15, wherein the on time as set by the controller is proportional to the duplicated output voltage divided by the input voltage.

17. The apparatus of claim 10, wherein the duplication module comprises a duplicated power stage comprising a duplicate first switch.

18. The apparatus of claim 17, wherein the duplication module comprises a filter stage coupled to the duplicated power stage.

19. The apparatus of claim 18, wherein the duplication module comprises a voltage buffer coupled to the filter stage and configured to provide the duplicate output voltage.

20. A method of controlling a switching converter for receiving an input voltage and for providing an output voltage, the switching converter comprising a first switch and an energy storage element, the method comprising:

providing a first control signal to the first switch, the first control signal having a switching frequency, using a controller; and controlling the switching frequency, using the controller, such that the switching frequency is substantially unaffected by variations in one or more of:

i) a load current;

ii) an equivalent series resistance of the energy storage element; and iii) a turn on resistance of the first switch.

* * * * *